(12) United States Patent
Rafferty et al.

(10) Patent No.: US 10,949,513 B2
(45) Date of Patent: *Mar. 16, 2021

(54) WEARABLE DEVICES AND ASSOCIATED SECURITY APPARATUS

(71) Applicant: Intel Corporation, Santa Clara, CA (US)

(72) Inventors: William A. Rafferty, Tallaght (IE); Diarmaid O'Cualain, Lucan (IE); Mike J. Hibbett, Marino (IE); Jelle Sels, Dublin (IE); Maurice Lynch, Mountmellick (IE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,156

(22) Filed: Oct. 21, 2019

(65) Prior Publication Data
US 2020/0125702 A1 Apr. 23, 2020

Related U.S. Application Data

(63) Continuation of application No. 15/584,772, filed on May 2, 2017, now Pat. No. 10,452,822.

(51) Int. Cl.
| | | |
|---|---|---|
| *G06F 7/04* | (2006.01) |
| *G06F 21/31* | (2013.01) |
| *G06F 1/16* | (2006.01) |
| *G06F 1/3231* | (2019.01) |
| *G06F 21/35* | (2013.01) |
| *G06F 21/88* | (2013.01) |

(52) U.S. Cl.
CPC .............. *G06F 21/31* (2013.01); *G06F 1/163* (2013.01); *G06F 1/1684* (2013.01); *G06F 1/3231* (2013.01); *G06F 21/35* (2013.01); *G06F 21/88* (2013.01)

(58) Field of Classification Search
CPC ...... G06F 1/163; G06F 1/1684; G06F 1/3231; G06F 21/31; G06F 21/35; G06F 21/88; Y02D 10/00
See application file for complete search history.

(56) References Cited

U.S. PATENT DOCUMENTS

| | | | |
|---|---|---|---|
| 10,452,822 B2 | 10/2019 | Rafferty et al. | |
| 2017/0199560 A1* | 7/2017 | Milford | G06F 3/011 |
| 2019/0014476 A1* | 1/2019 | Maragoudakis | H04M 1/7253 |

OTHER PUBLICATIONS

United States Patent and Trademark Office, "Notice of Allowance and Fee(s) Due" issued in connection with U.S. Appl. No. 15/584,772, dated Jun. 17, 2019, (7 pages).

(Continued)

*Primary Examiner* — Olugbenga O Idowu
(74) *Attorney, Agent, or Firm* — Hanley, Flight & Zimmerman, LLC

(57) ABSTRACT

Wearable devices and associated security apparatus are disclosed. An example apparatus includes a strap including a first conductor and a second conductor, when the strap is open, the first and second conductors are a first distance apart, when the strap is closed, the first and second conductors are a second distance apart, the first distance is greater than the second distance; and a device access enabler, to: provide a reference signal to the first conductor; and monitor a response to the reference signal to determine if the strap is open or closed.

15 Claims, 14 Drawing Sheets

(56) References Cited

OTHER PUBLICATIONS

United States Patent and Trademark Office, "Non-Final Office Action," issued in connection with U.S. Appl. No. 15/584,772, dated Jan. 23, 2019, (10 pages).

* cited by examiner

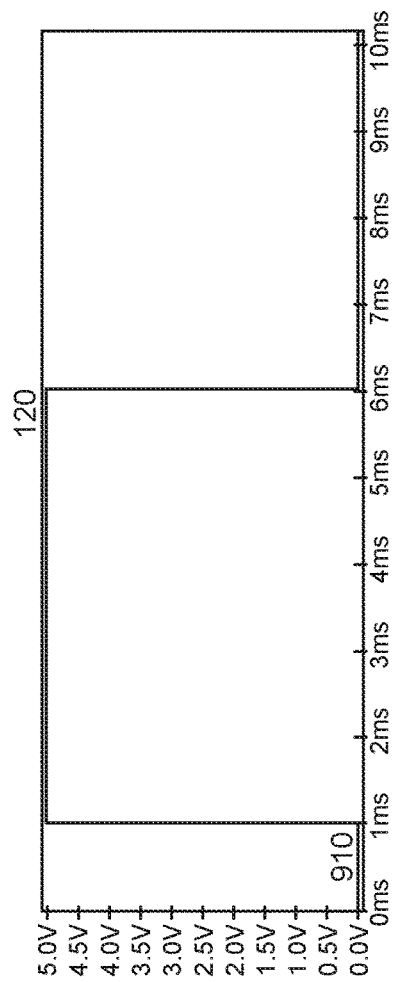
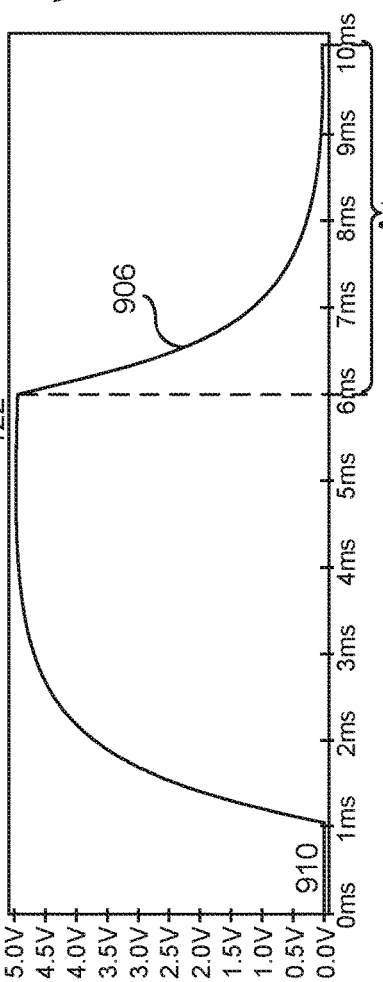
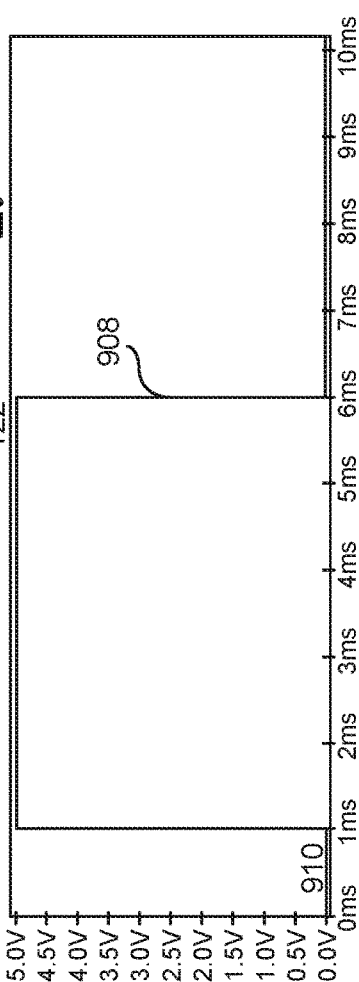

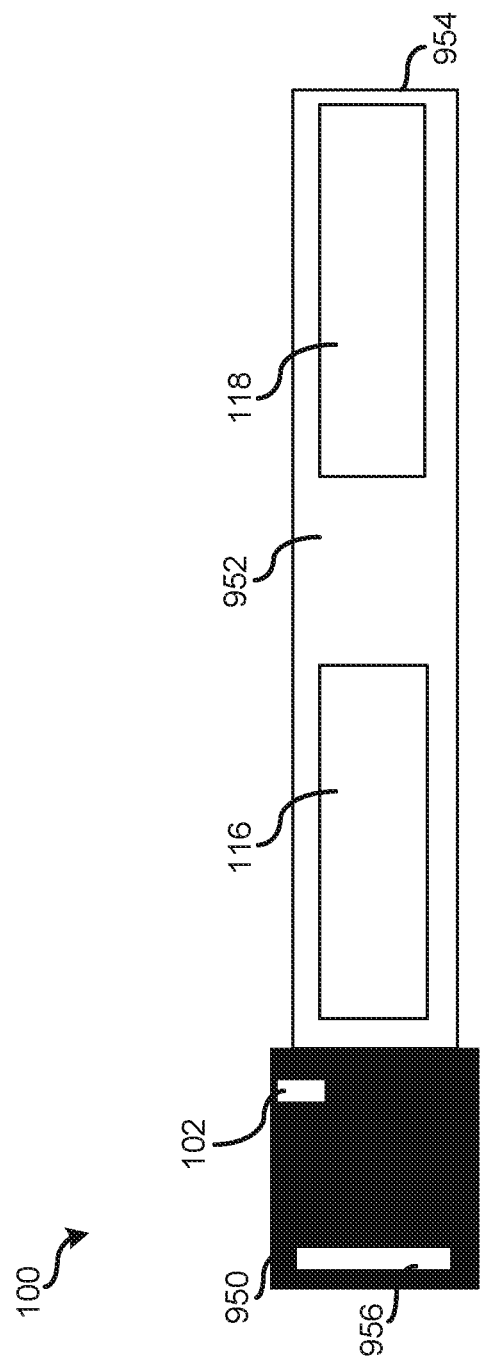

US 10,949,513 B2

WEARABLE DEVICES AND ASSOCIATED SECURITY APPARATUS

RELATED APPLICATION

This patent arises from a continuation of U.S. patent application Ser. No. 15/584,772 (now U.S. Pat. No. 10,452, 822), which was filed on May 2, 2017. U.S. patent application Ser. No. 15/584,772 is hereby incorporated herein by reference in its entirety. Priority to U.S. patent application Ser. No. 15/584,772 is hereby claimed.

FIELD OF THE DISCLOSURE

This disclosure relates generally to wearable devices, and, more particularly, to wearable devices and associated security apparatus.

BACKGROUND

A gesture may be requested prior to enabling access to some wearable devices. The gesture may include a code entered by a wearer of the wearable device.

BRIEF DESCRIPTION OF THE DRAWINGS

FIG. 5A is a plot of a reference signal being applied to the example device of FIG. 1B.

FIG. 5B is a plot representing a first response of the first circuit of FIG. 3A.

FIG. 5C is a plot representing a second response of the second circuit of FIG. 3B.

FIG. 9 illustrates another example wearable device that can be used to implement the device of FIGS. 1A and 1B.

The figures are not to scale. Wherever possible, the same reference numbers will be used throughout the drawing(s) and accompanying written description to refer to the same or like parts.

DETAILED DESCRIPTION

The examples disclosed herein relate to wearable devices that use low-power consumption techniques to determine when the wearable devices are being worn. In some examples, if the device is not being worn and/or is not on someone's wrist, the device may prevent further use without authenticating information being provided. However, if the device is being worn and/or is on someone's wrist, the device may enable use of the device. In some examples, the authenticating information is a passcode and/or other gesture. As set forth herein, use of the device means that a person may access content and/or functionality stored on and/or accessible to the wearable device.

In some examples, to determine whether the device is being worn, strap ends of the device include conductors such as, flexible insulated conductors, coupled to the strap and/or embedded within the strap. In some examples, these example conductors are configured to overlap and form a capacitor when the device is being worn and are configured to form an open circuit when the device is not being worn. Thus, by placing the conductors on the strap, the example wearable devices disclosed herein may identify the status of device while also having a relatively small and/or thin profile.

To monitor for the presence of the capacitor formed by the strap ends and, thus, an indication that the device is being worn, in some examples, a general-purpose input/output (GPIO) provides a reference signal in the form of a square wave to a first end of the device and a comparator monitors the charge and/or discharge rate of the conductor. In some examples, the device determines that the device is being worn when the comparator reaches a value (e.g., 0 Volts (V)) after a threshold amount of time. In some examples, the device determines that the device is not being worn when the response reaches a value (e.g., 0 Volts (V)) before the threshold amount of time.

In some examples, the devices disclosed herein include security enablement context aware functionality that monitor activities associated with the device, the position of the device, movement of the device, the time of day, etc. In some examples, this security enablement context aware functionality enables these devices to have enhanced security features. For example, if the device determines that the device is being worn but the user is sleeping, the device may require authenticating information prior to enabling access to the content on the device.

Figure 1A:
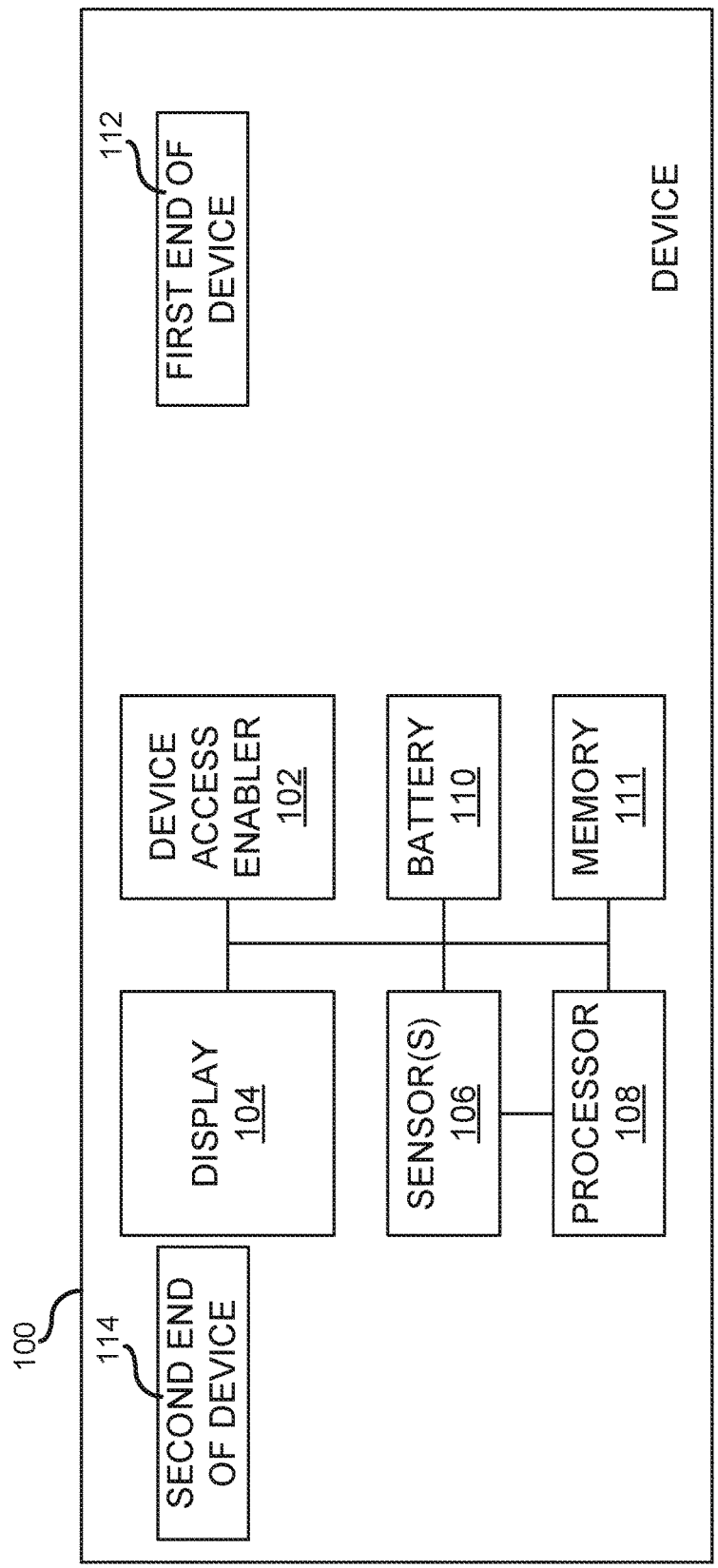
FIG. 1A is a schematic illustration of an example device implemented in accordance with the teachings of this disclosure

FIG. 1A is a schematic diagram of an example wearable device 100 that can be used to detect when the device 100 is being worn. The device 100 can be any type of device such as, for example, a watch, a smart watch and/or any other device including a processor and/or communication capability. In this example, the device 100 includes an example device access enabler 102, an example display 104, an example sensor(s) 106, an example processor 108, an example battery 110 and an example memory 111. In some examples, the sensor(s) 106 includes a camera(s), a proximity sensor(s), a touch sensor(s), a global positioning sensor(s) (GPS), an accelerometer(s), a gravitational sensor(s), etc.

Further, in the illustrated example, to enable the device 100 to be worn by an individual, the example device 100 includes a first end 112 that is couplable to a second end 114. In some examples, the first and second ends 112, 114 are ends of straps of the device 100. The first and second ends 112, 114 may include any type of latch and/or other fastener to enable the ends 112, 114 to be coupled and to enable the device 100 to be coupled to a person's wrist and/or other part of the body.

In some examples, having the first and second ends 112, 114 coupled is indicative of the device 100 being worn by an individual. In other examples, having the first and second ends 112, 114 not coupled and/or are otherwise not immediately adjacent to one another is indicative of the device 100 not being worn by an individual. In examples where the first and second ends 112, 114 include a buckle to enable the first and second ends 112, 114 to be coupled, the first and second ends 112, 114 may be considered not coupled if a pin of the buckle is not in contact with a remainder of the buckle. In some examples, when the device 100 is being worn by an individual, the device access enabler 102 may not require authenticating information to be entered prior to enabling access to the device 100. For example, if the device access enabler 102 determines that authenticating information was previously provided during a wearing period of the device 100, the device access enabler 102 may not require authenticating information to be provided. Alternatively, if the device access enabler 102 determines that authenticating information was not entered during the wearing period, the device access enabler 102 may require that authenticating information be provided. The wearing period may begin when the device 100 is turned on and is being worn and end when the device is turned off and/or is not being worn.

In other words, in some examples, when the device 100 is taken off of someone's arm, the wearing period end and authenticating information is required to again access data on the device 100. In some examples, the device access enabler 102 may require authenticating information to be entered if the device 100 is identified as locked and the first and second ends 112, 114 are coupled and/or not coupled. In some examples, the device access enabler 102 may not require authenticating information to be entered if the device 100 is unlocked and the first and second ends 112, 114 are coupled and/or adjacent one another. The device 100 may be considered unlocked if authenticating information has been entered during a wearing period and the device 100 may be considered locked if authenticating information has not been entered during the wearing period.

Figure 1B:
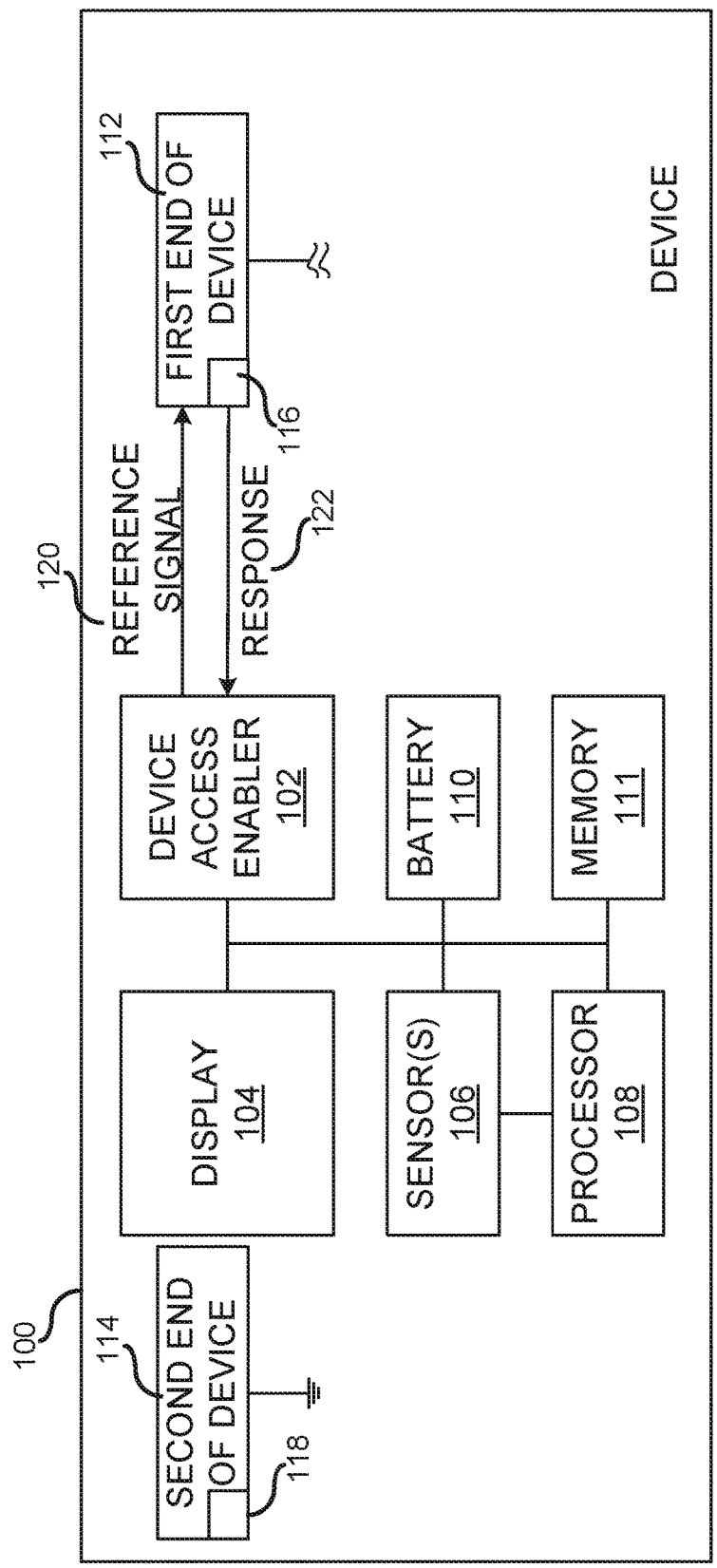
FIG. 1B is a schematic illustration of an example device implemented in accordance with the teachings of this disclosure.

FIG. 1B illustrates an example implementation of the example device 100 including a first conductor 116 at the first end 112 of the device 100 and a second conductor 118 at the second end 114 of the device 100 to enable the device access enabler 102 to determine whether the device 100 is being worn. In some examples, the first and/or second conductors 116, 118 are flexible insulated conductors, braided conductors and/or woven conductors that are embedded and/or otherwise coupled adjacent the ends 112, 114.

In this example, the conductors 116, 118 on the first and second ends 112, 114 of the device 100 are configured to overlap and form a capacitor 302 (FIG. 3A) when the device 100 is being worn and are configured to form an open circuit 402 (FIG. 3B) when the device 100 is not being worn. To monitor for the presence of the capacitor 302 (FIG. 3A) formed based on the positioning of the first and second conductors 116, 118, the device access enabler 102 generates a reference signal 120 directed towards the first conductor 116 and monitors for a response 122 to the reference signal 120.

In some examples, the reference signal 120 is a square wave that periodically applies a voltage to the first conductor 116. In some examples when the capacitor 302 is formed based on the ends 112, 114 being coupled and/or immediately adjacent one another, the response 122 does not track the square wave and, thus, the response 122 is a resistive/capacitive (RC) response. In other words, when the ends 112, 114 are immediately adjacent one another, the response 122 reaches and/or equals a reference value within a first-time period that is equal and/or greater than a threshold period. In some examples, when the capacitor 302 is not formed based on the ends 112, 114 not being coupled and/or being spaced from one another, the response 122 substantially tracks the square wave and, thus, the response 122 is a non-resistive/capacitive (RC) response. In other words, when the ends 112, 114 are spaced from one another, the response 122 reaches and/or equals the reference value within a second-time period that satisfies the threshold and is shorter than the first-time period.

In examples in which the device access enabler 102 determines that the device 100 is being worn and/or that the response 122 is indicative of and/or associated with a resistive/capacitive response, the device access enabler 102 may enable access to the device 100 if authenticating information has been provided during a wearing period of the device 100. If the device access enabler 102 determines that authenticating information was not provided during the wearing period, in some examples, the device access enabler 102 requires authenticating information to be provided prior to enabling use of the device 100. The authenticating information may include a passcode, a gesture and/or any other movement and/or action (e.g. fingerprint) to access the device 100.

In some examples, the device access enabler 102 monitors context information and/or activities of the device 100 to determine whether to require authenticating information prior to enabling use of the device 100. For example, if the device access enabler 102 determines that the device 100 has not been used for a threshold amount of time and/or that the user is sleeping, the device access enabler 102 may require authenticating information to be provided prior to enabling use of the device 100.

Figure 2:
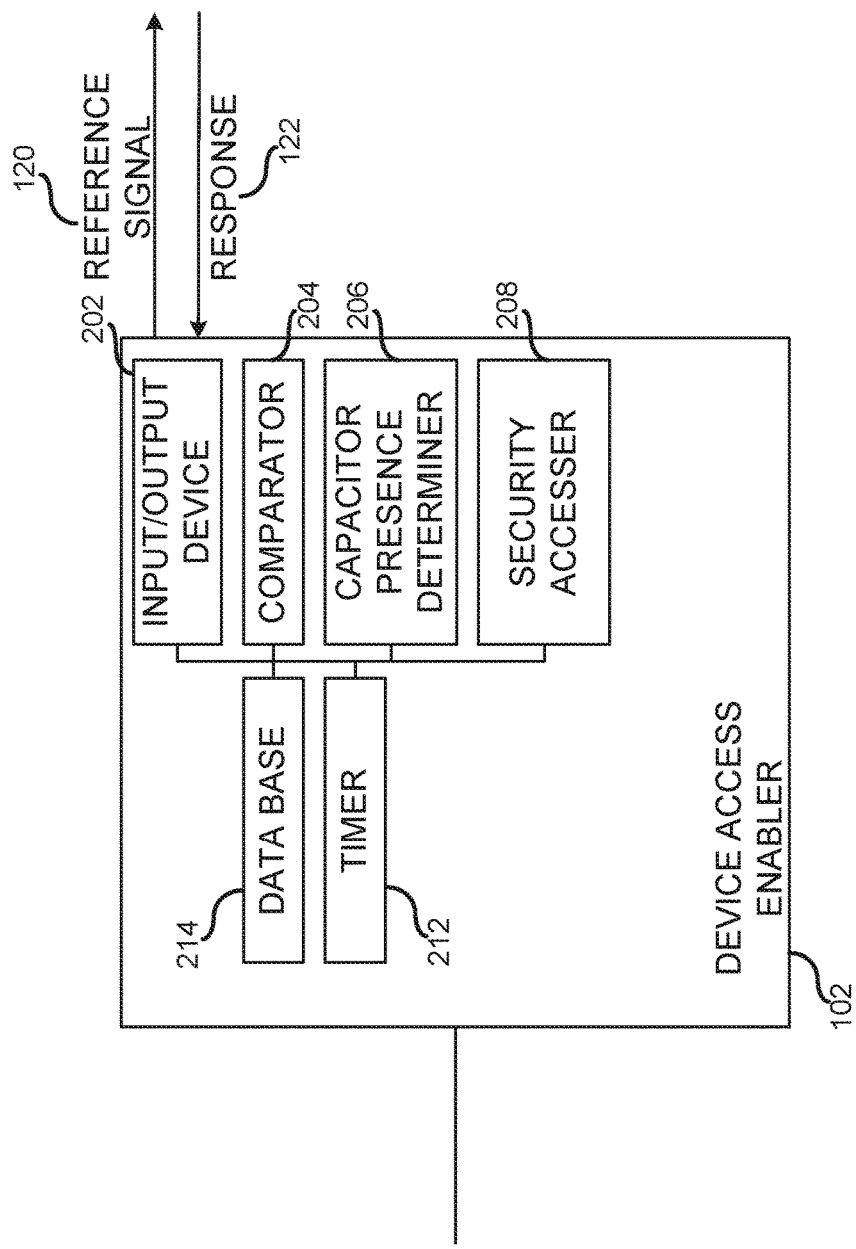
FIG. 2 is a schematic illustration of an example device access enabler of the device of FIGS. 1A and 1B.

FIG. 2 illustrates an example implementation of the device access enabler 102 of FIGS. 1A and 1B. In the illustrated example, the device access enabler 102 includes an example input/output device 202, an example comparator 204, an example capacitor presence determiner 206, an example security accesser 208, an example timer 212 and an example data base 214.

To monitor for the presence of the capacitor 302 (FIG. 3A) formed based on the positioning of the first and second conductors 116, 118, in some examples, the input/output device 202 generates the reference signal 120 that is directed toward the first conductor 116 and monitors for the response 122 to the reference signal 120 provided. The response 122 being associated with a resistive/capacitive response may indicate that the ends 112, 114 are coupled and a non-resistive/capacitive response may indicate that the ends 112, 114 are not coupled.

To determine when the response 122 is a resistive/capacitive response associated with the ends 112, 114 being coupled and/or when the response 122 is a non-resistive/capacitive response associated with the ends 112, 114 not being coupled, in some examples, the example comparator 204 determines when a value of the response 122 equals a reference value and the timer 212 determines an amount of time that the response 122 takes to reach and/or equal the reference value.

In the illustrated example, the capacitor presence determiner 206 determines that the capacitor 302 is present and/or that the conductors 116, 118 are overlapping based on the amount time being equal to and/or greater than a threshold time period. More generally, the capacitor presence determiner 206 determines that the capacitor 302 is present when the response 122 does not track the reference signal 120. In the illustrated example, the capacitor presence determiner 206 determines that the open circuit 402 is present and/or that the conductors 116, 118 are not overlapping based on the amount time being less the threshold time period. More generally, the capacitor presence determiner 206 determines that the open circuit 402 is present when the response 122 tracks and/or substantially tracks the reference signal 120. As set forth herein, the phrase "substantially tracks the reference signal" means that the response 122 is the same as the reference signal 120 but for a time delay between the response 122 and the reference signal 120 and/or accounts for transmission delays and/or other interference and/or resistance.

In examples in which the capacitor presence determiner 206 determines that the device 100 is being worn, the security accesser 208 determines whether authenticating information has been provided to the device 100 during a wearing period of the device 100 and/or since the device 100 has been turned on. Additionally and/or alternatively, in examples in which the capacitor presence determiner 206 determines that the response 122 is indicative of and/or associated with a resistive/capacitive response, the security accesser 208 determines whether authenticating information has been provided to the device 100 during a wearing period of the device 100 and/or since the device 100 has been turned on.

In some examples, to determine whether authenticating information has been provided, the security accesser 208 accesses a log stored in the data base 214 that identifies a first time when the device 100 was identified as being worn and/or turned on and a second time when access was granted to the device 100 based on authenticating information being received, accepted and/or approved. To determine when the authenticating information was provided relative to the device 100 being turned on and/or being worn, the security accesser 208 compares the first time and the second time to determine which occurred first. In examples in which the first time is before the second time, the security accesser 208 determines that access has been granted to the device 100 during a wearing period and the security accesser 208 may enable access to the device 100 without requiring further authenticating information. In examples in which the first time is after the second time, the security accesser 208 may determine that access has not been granted to the device 100 during the wearing period and may not enable use of the device 100 without authenticating information being provided.

While an example manner of implementing the device access enabler 102 of FIGS. 1A and 1B is illustrated in FIG. 2, one or more of the elements, processes and/or devices illustrated in FIGS. 1A and 1B may be combined, divided, re-arranged, omitted, eliminated and/or implemented in any other way. Further, the example input/output device 202, the example comparator 204, the example capacitor presence determiner 206, the example security accesser 208, the example timer 212, the example data base 214 and/or, more generally, the example device access enabler 102 of FIGS. 1A and 1B may be implemented by hardware, software, firmware and/or any combination of hardware, software and/or firmware. Thus, for example, any of the example input/output device 202, the example comparator 204, the example capacitor presence determiner 206, the example security accesser 208, the example timer 212, the example data base 214 and/or, more generally, the example device access enabler 102 of FIGS. 1A and 1B could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input/output device 202, the example comparator 204, the example capacitor presence determiner 206, the example security accesser 208, the example timer 212, the example data base 214 and/or, more generally, the example device access enabler 102 of FIGS. 1A and 1B is/are hereby expressly defined to include a tangible computer readable storage device or storage disk such as a memory, a digital versatile disk (DVD), a compact disk (CD), a Blu-ray disk, etc. storing the software and/or firmware. Further still, the example device access enabler 100 of FIGS. 1A and 1B may include one or more elements, processes and/or devices in addition to, or instead of, those illustrated and/or may include more than one of any or all of the illustrated elements, processes and devices.

Figure 3A:
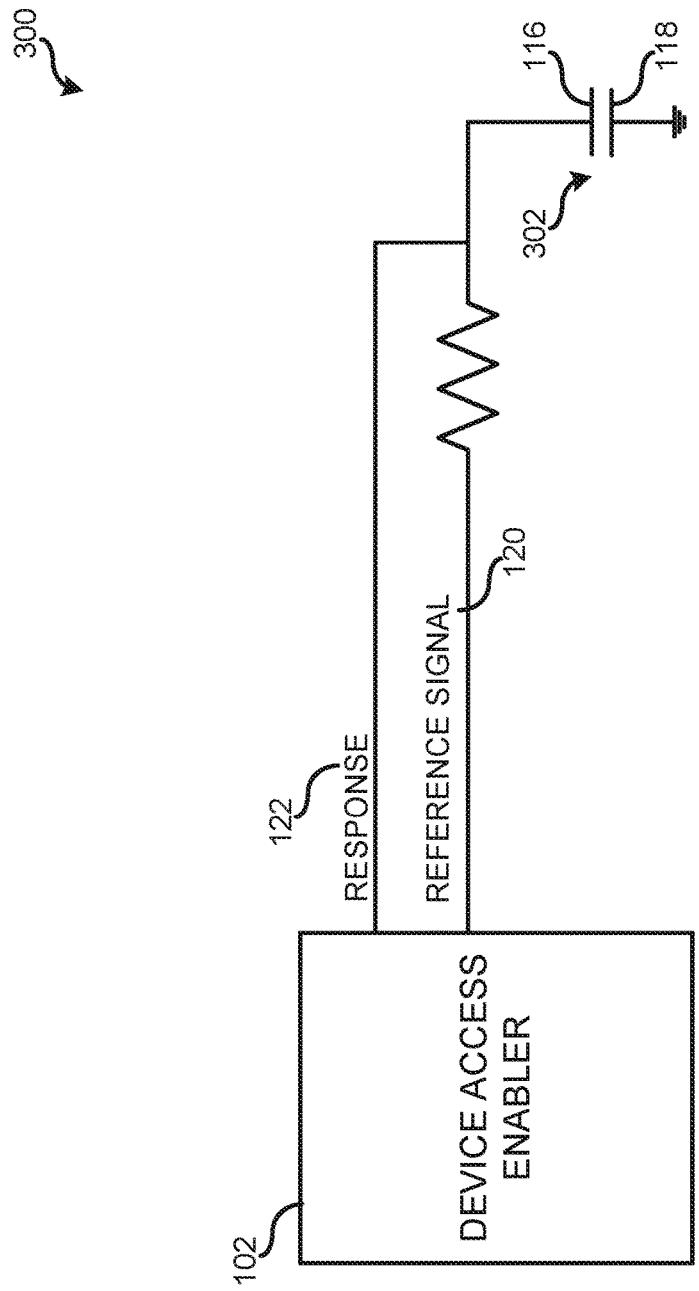
FIG. 3A illustrates a first circuit provided by the device of FIG. 1B when the first end and the second end of the device are adjacent to one another.

FIG. 3A is an example illustration of a circuit 300 including the device access enabler 102, the first and second conductors 116, 118 and the capacitor 302 formed based on the proximity of the first and second conductors 116, 118. In this example, the device access enabler 102 generates the reference signal 120 and receives the response 122. In the illustrated example of FIG. 3A, based on the relative positioning of the conductors 116, 118 that the form the capacitor 302, the response 122 is associated with a resistive/capacitive response (e.g., the capacitor 302) that indicates that the device 100 is being worn (e.g., the device 100 is on someone's wrist).

Figure 3B:
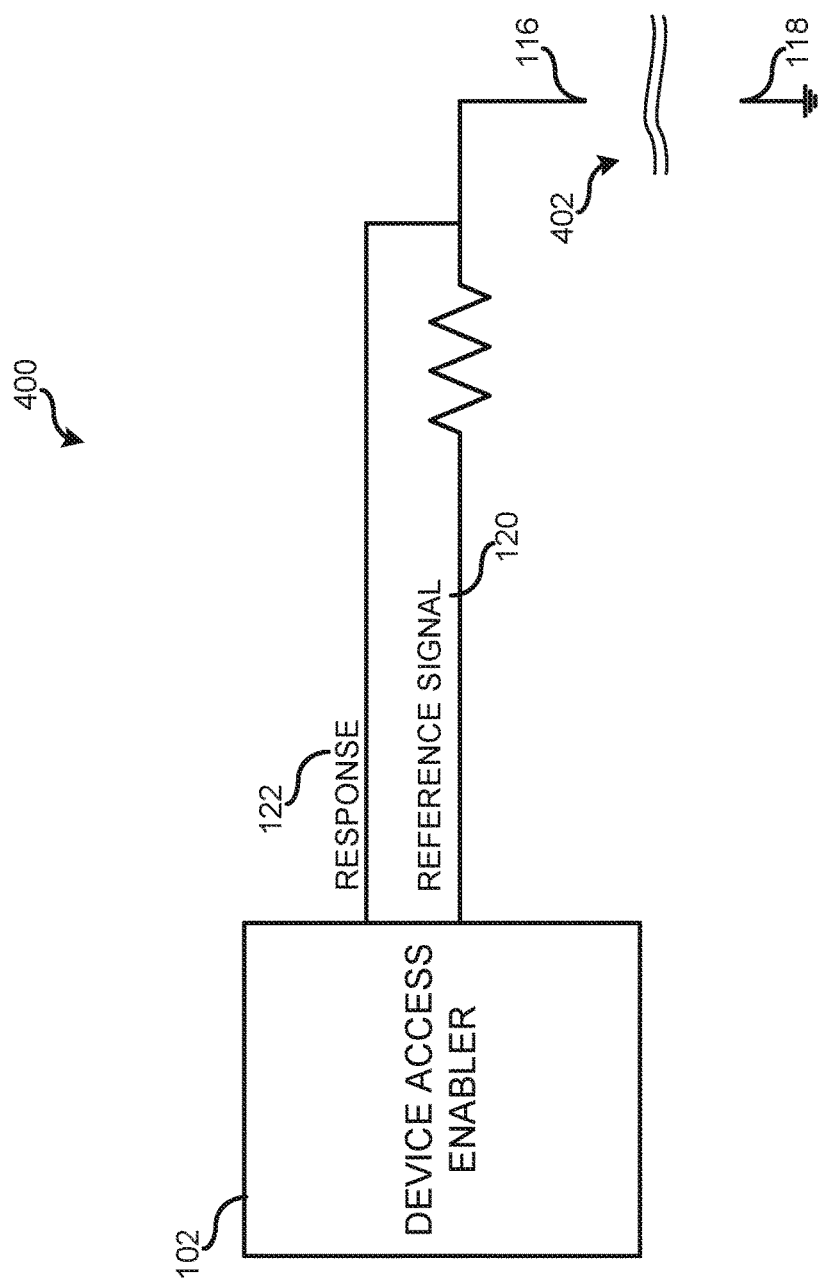
FIG. 3B illustrates a second circuit provided by the device of FIG. 1B when the first end and the second end of the device are spaced from one another.

FIG. 3B is an example illustration of a circuit 400 including the device access enabler 102 and the first and second conductors 116, 118 not proximate one another. Thus, the circuit 400 of FIG. 3B is shown as the open circuit 402 and does not include the capacitor 302. In this example, the device access enabler 102 generates the reference signal 120 and receives the response 122. In the illustrated example of FIG. 3B, based on the relative positioning of the conductors 116, 118 being spaced from one another and the capacitor 302 not being formed, the response 122 is associated with a non-resistive/capacitive response that indicates that the device 100 is not being worn (e.g., the device 100 is not on someone's wrist).

Figure 4:
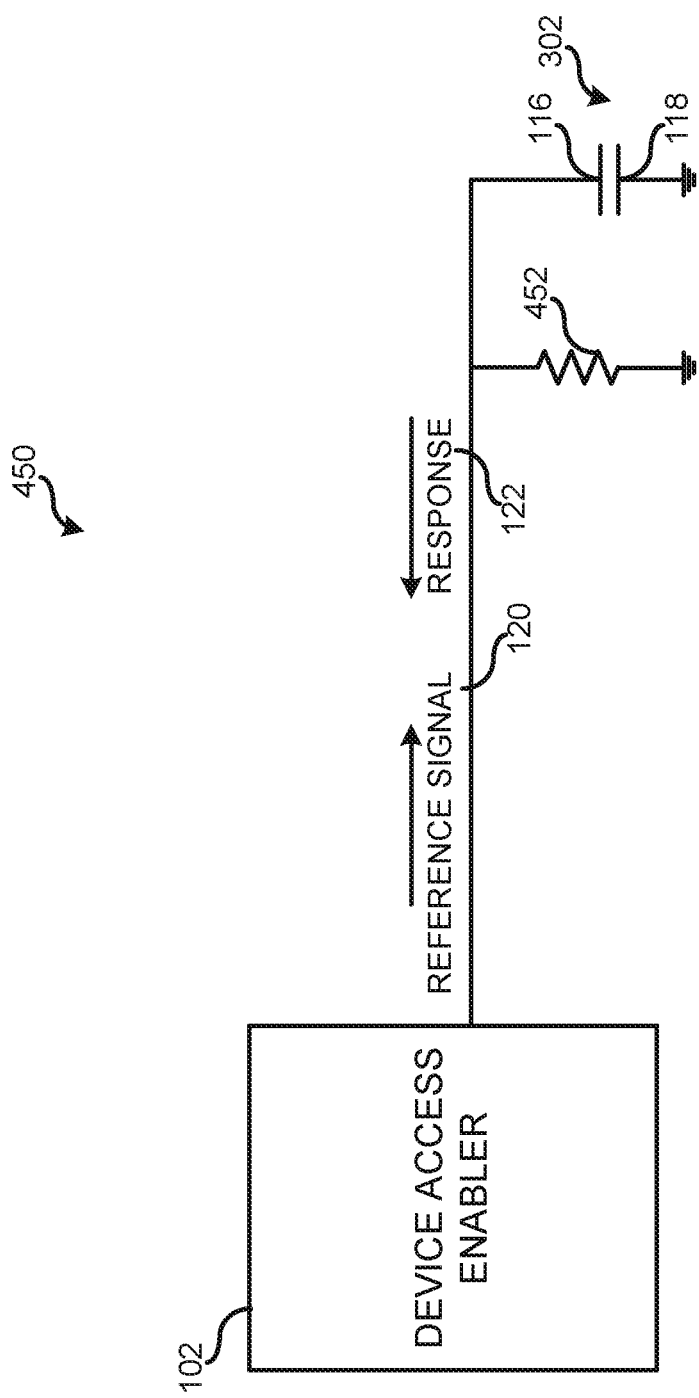
FIG. 4 illustrates a third circuit provided by the device of FIG. 1B when the first end and the second end of the device are adjacent to one another.

FIG. 4 is an example illustration of a circuit 450 including the device access enabler 102 and the first and second conductors 116, 118 proximate one another. Thus, the circuit 450 of FIG. 4 is shown as including the capacitor 302. In this example, the device access enabler 102 is implemented by a general-purpose input/output device (GPIO) and a timer. In some examples, to determine whether the conductors 116, 118 are proximate one another, the GPIO generates the reference signal 120, the timer begins and the GPIO (e.g., switches to and/or acting as an input) monitors the response 122 as the response discharges through a resistor 452. In some examples, when an interrupt (e.g., a low-level interrupt) identifies the value of the response 122 as satisfying a threshold value, the timer stops. In some examples, when the conductors 116, 118 are proximate one another, the time is greater than a threshold amount of time. In some examples, when the conductors 116, 118 are spaced one another, the time is less than or equal to a threshold amount of time.

FIG. 5A, FIG. 5B and FIG. 5C depict graphs 900, 902 904 of results obtained using the example wearable devices disclosed herein. As shown in FIG. 5A, in this example, the reference signal 120 provided to the first conductor 116 is a square wave. As shown in the graph 902 of FIG. 5B, a first line 906 represents the response when the first and second conductors 116, 118 are adjacent one another and, thus, the response is different than the square wave reference signal 120. As shown in the graph 904 of FIG. 5C, a second line 908 represents the response when the first and second conductors 116, 118 are spaced apart and, thus, the response substantially tracks the square wave reference signal 120. As shown by comparing FIGS. 5B and 5C, a time difference is present between when the first line 906 reaches a threshold value 910 and when the second line 908 reaches the threshold value 910 where the time difference (Δt) is associated with the capacitor 302 being present and/or the conductors 116, 118 overlapping.

Figure 6B:
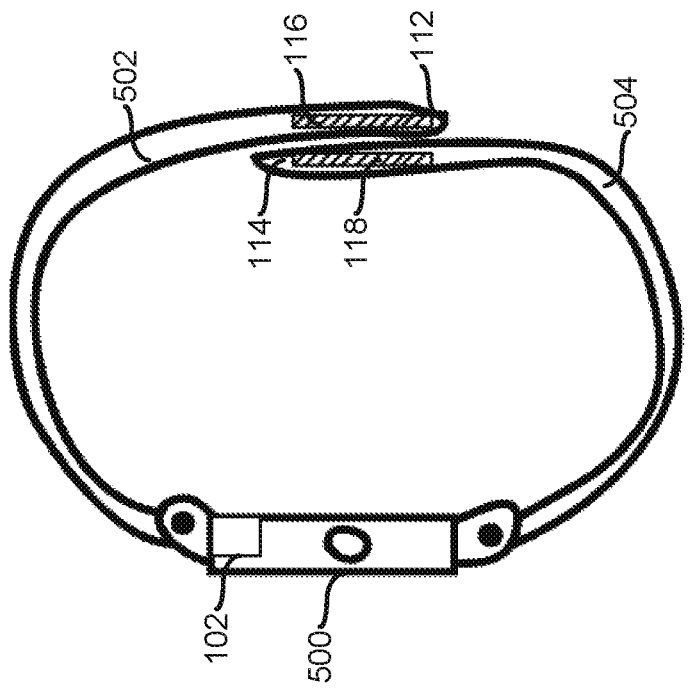
FIG. 6B illustrates the wearable device of FIG. 6A, wherein the ends of the wearable device are at a second distance from one another.
Figure 6A:
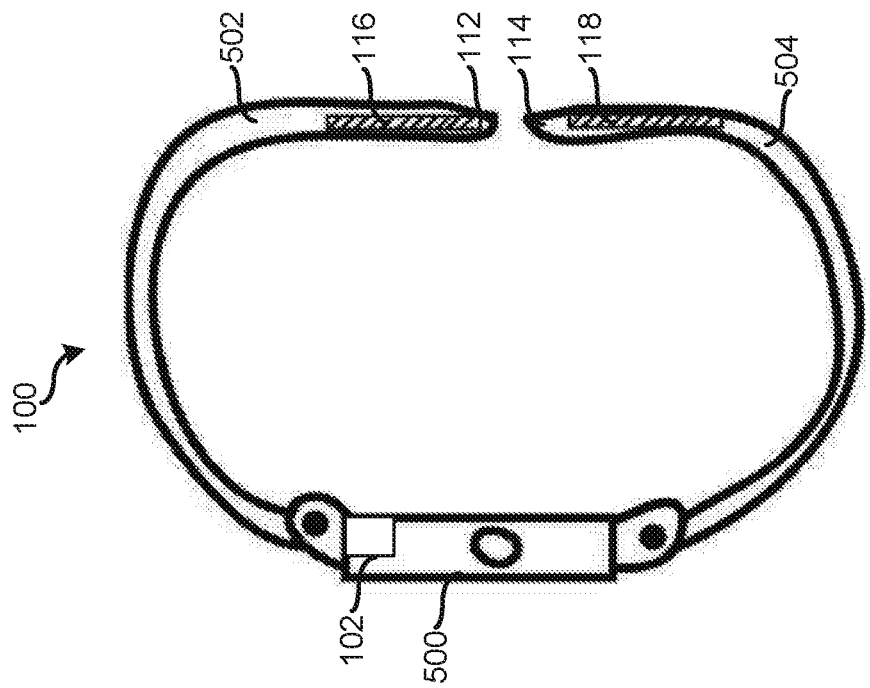
FIG. 6A illustrates an example wearable device that can be used to implement the device of FIGS. 1A and 1B, wherein the ends of the wearable device are at a first distance from one another.

FIGS. 6A and 6B illustrate an example implementation of the device 100 of FIGS. 1A and 1B as a watch or other wearable device. In the illustrated example, the device 100 includes a face 500 including the device access enabler 102, a first strap 502 including the first end 112 and the first conductor 116 and a second strap 504 including the second end 114 and the second conductor 118. The example of FIG. 6A illustrates the ends 112, 114 spaced apart and the conductors 116, 118 not overlapping indicative of the device 100 not being worn. The example of FIG. 6B illustrates the ends 112, 114 adjacent one another and/or coupled and the conductors 116, 118 overlapping indicating that the device 100 is being worn. In some examples, to couple the straps 502, 504 together, one of straps 502, 504 includes a latch and/or a projection and the other of the straps 502, 504 includes an aperture(s) to receive the latch and/or the projection to couple the straps 502, 504 together.

Figure 7:
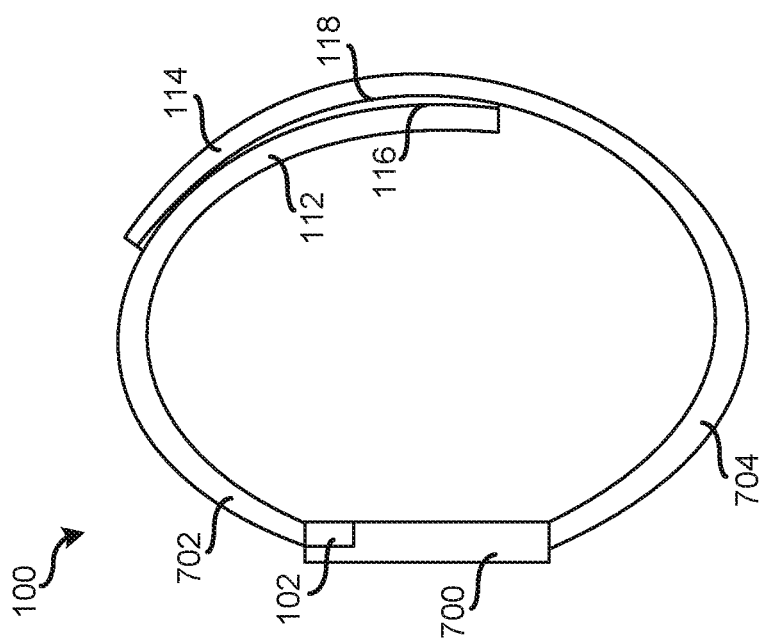
FIG. 7 illustrates another example wearable device that can be used to implement the device of FIGS. 1A and 1B.

FIG. 7 illustrates another example implementation of the device 100 of FIGS. 1A and 1B as a watch or other wearable device. In the illustrated example, the device 100 includes a face 700 including the device access enabler 102, a first strap 702 including the first end 112 and the first conductor 116 and a second strap 704 including the second end 114 and the second conductor 118. In some examples, the conductors 116, 118 are embedded and/or otherwise coupled to the respective first and second straps 702, 704. The example of FIG. 7 illustrates the ends 112, 114 adjacent one another and/or coupled and the conductors 116, 118 overlapping indicating that the device 100 is being worn.

Figure 8:
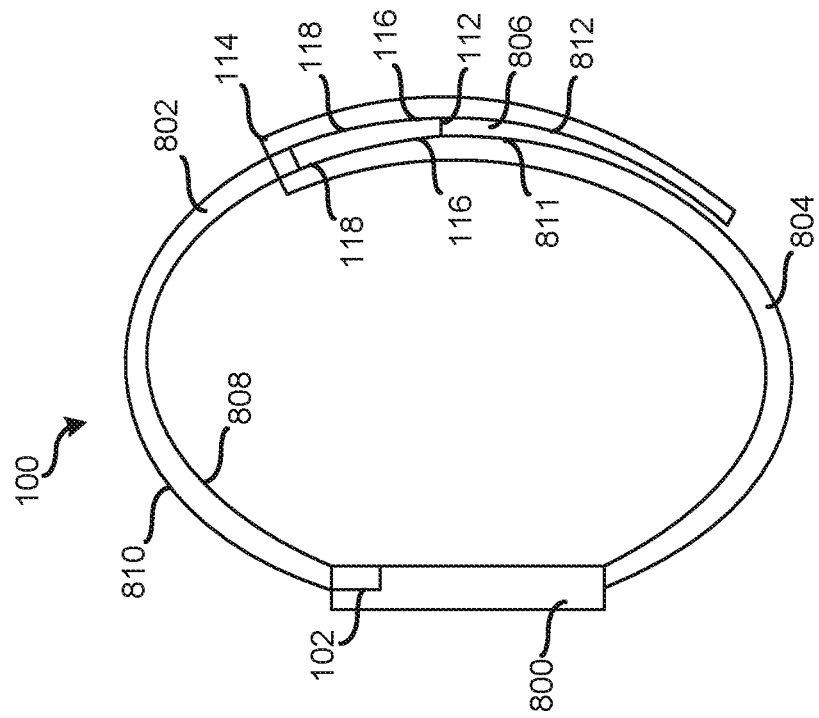
FIG. 8 illustrates another example wearable device that can be used to implement the device of FIGS. 1A and 1B.

FIG. 8 illustrates another example implementation of the device 100 of FIGS. 1A and 1B as a watch or other wearable device. In the illustrated example, the device 100 includes a face 800 including the device access enabler 102, a first strap 802 including the first end 112 and the first conductor 116 and a second strap 804 including the second end 114 and the second conductor 118. In the illustrated example of FIG. 8, the second strap 804 defines an aperture 806 that receives the first end 112 to couple the first and second ends 112, 114 and/or to enable the device 100 to be worn. In some examples, the first conductor 116 includes a first portion on a first side 808 of the first strap 802 and a second portion on a second side 810 of the strap 802. Correspondingly, in some examples, the second conductor 118 include a first portion on a first side 811 of the aperture 806 and a second portion on a second side 812 of the aperture 806. In other examples, the second strap 804 includes both the first conductor 116 and the second conductor 118 that overlap when the second strap 804 is positioned through an aperture defined by the first strap 802 and disposed over itself (e.g., the second strap 804 overlaps). The example of FIG. 8 illustrates the ends 112, 114 adjacent one another and/or coupled and the conductors 116, 118 overlapping indicating that the device 100 is being worn.

FIG. 9 illustrates another example implementation of the device 100 of FIGS. 1A and 1B as a watch or other wearable device. In the illustrated example, the device 100 includes a face 950 including the device access enabler 102 and a single strap 952 including the first conductor 116 and the second conductor 118. The example of FIG. 9 illustrates the conductors 116, 118 spaced from one another indicating that the device 100 is not being worn. In some examples, to couple the device 100 to someone's wrist, an end 954 of the strap 952 is positioned through an aperture 956 and coupled upon itself using, for example, a fastener, a magnet, a hook and loop fastener, a projection that is received in an aperture, etc. While the example of FIG. 9 depicts a single strap, in other examples, the device 100 illustrated in FIG. 9 may include two straps where one or both of straps include a conductor(s).

Figure 10:
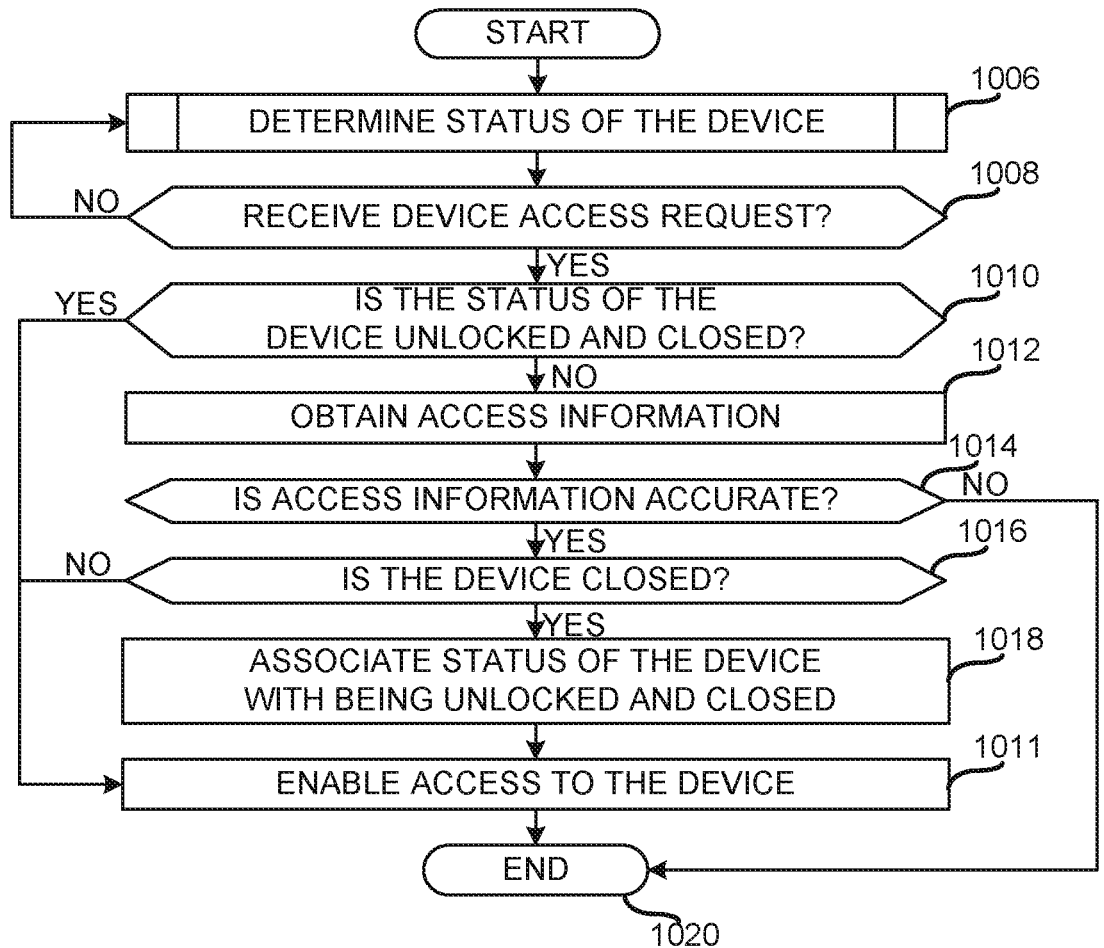
FIG. 10 is a flow chart representative of machine readable instructions that may be executed to implement the example device access enabler of FIGS. 1A and 1B.
Figure 11:
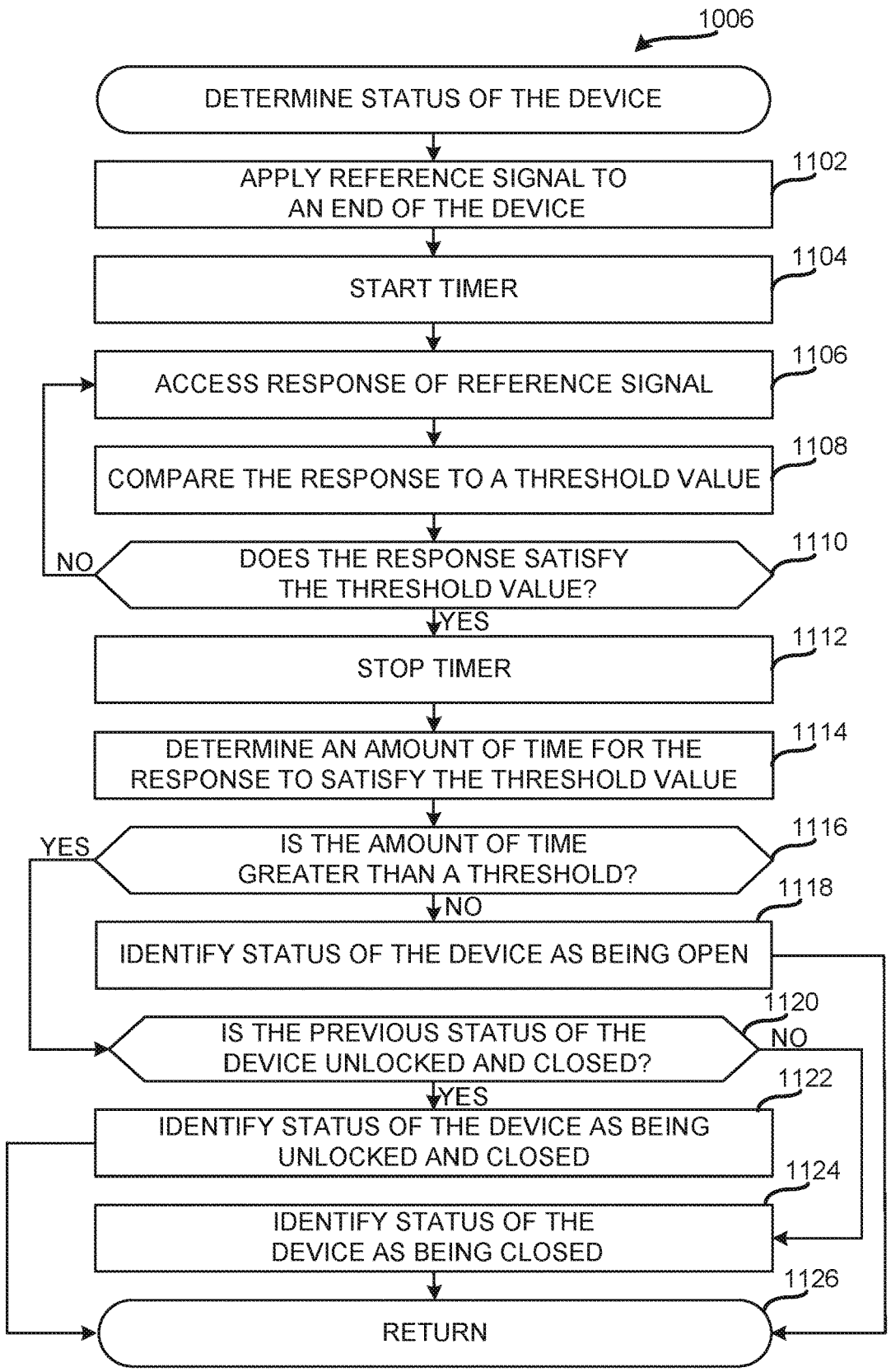
FIG. 11 is a flow chart representative of machine readable instructions that may be executed to implement the device access enabler of FIGS. 1A and 1B to perform the processes of FIG. 10 to determine a status of a strap of the device.

A flowchart representative of example machine readable instructions for implementing the device access enabler 102 of FIGS. 1A and 1B is shown in FIGS. 10 and 11. In this example, the machine readable instructions comprise a program for execution by a processor such as the processor 1212 shown in the example processor platform 1200 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIGS. 10 and 11, many other methods of implementing the example device access enabler 102 may alternatively be used. For example, the order of execution of the blocks may be changed, and/or some of the blocks described may be changed, eliminated, or combined.

As mentioned above, the example processes of FIGS. 10 and 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 10,11 and 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 10 begins by the device access enabler 102, the capacitor presence determiner 206 and/or the security accesser 208 determining the status of the strap 502, 504, 702, 704, 802, 804 of the device 100 (block 1006). In some examples, the processes performed at block 1006 are continuously performed while the device 100 is turned on. Thus, in such examples, the status of the device 100 is monitored when the device 100 is turned on.

In some examples, the device access enabler 102, the capacitor presence determiner 206 and/or the security accesser 208 determines that the device 100 and/or the strap 502, 504, 702, 704, 802, 804 of the device 100 is closed based on the capacitor presence determiner 206 identifying the response 122 as being associated with a resistive/capacitive response and/or the capacitor 302. In some examples, the device access enabler 102, the capacitor presence determiner 206 and/or the security accesser 208 determines that the device 100 and/or the strap 502, 504, 702, 704, 802, 804 of the device 100 is open based on the capacitor presence determiner 206 identifying the response 122 as being associated with a non-resistive/capacitive response and/or being associated with the open circuit 402.

The input/output device 202 and/or the security accesser 208 determine whether an access request has been received (block 1008). In some examples, the input/output device 202 and/or the security accesser 208 identifies an access request being received based on data from the sensor(s) 106 and/or an individual touching the display 104 of the device 100.

If the input/output device 202 and/or the security accesser 208 determines that an access request has been received, the security accesser 208 determines whether the status of the device 100 is unlocked and closed (block 1010). If the security accessor 208 determines that the device 100 is unlocked and closed, the security accessor 208 enables access to the device 100 (block 1011). In some examples, the device 100 is unlocked when access has been granted to data on the device 100. In some examples, the device 100 is locked when access has not been granted to data on the device 100. In some examples, the device 100 is closed when the straps 502, 504, 702, 704, 802, 804 are coupled. In some examples, the device 100 is open when the straps 502, 504, 702, 704, 802, 804 are not coupled.

If the security accessor 208 determines that the device 100 is unlocked and/or not closed, the security accessor 208 requests and/or obtains access information via, for example, the input/output device 202 and/or the sensor(s) 106 (block 1012) and the security accessor 208 determines whether the access information is accurate (block 1014). In some examples, the access information includes a passcode, a gesture and/or any other movement and/or action to authenticate access to the device 100.

If the access information is accurate, the device access enabler 102, the capacitor presence determiner 206 and/or the security accesser 208 determine whether the device 100 is closed (block 1016). If the device access enabler 102, the capacitor presence determiner 206 and/or the security accesser 208 determine that the device 100 is closed, the device access enabler 102, the capacitor presence determiner 206 and/or the security accesser 208 associate the status of the device 100 with being unlocked closed (block 1018) and access to the device is enabled (block 1011). However, if the security accessor 208 determines that the access information is not accurate. the process ends (block 1020).

FIG. 11 illustrates an example of performing the processes of block 1006 to determine the status of the device 100. The program of FIG. 11 begins with the input/output device 202 and/or the device access enabler 102 applying the reference signal 120 to the first end 112 of the device 100 (block 1102). The timer 212 begins (block 1104) and the input/out output device 202 and/or the device access enabler 102 accesses the response 122 of the reference signal 120 (block 1106). The comparator 204 compares the response 122 to a reference value accessed from the data base 214 (block 1108).

The comparator 204 determines if the response 122 satisfies the reference value (block 1110). When the comparator 204 determines that the response 122 satisfies the reference value, the timer 212 stops (block 1112) and the timer 212 determines an amount of time taken for the response 122 to satisfy, reach and/or equal the reference value (block 1114). The device access enabler 102 and/or the capacitor presence determiner 206 determine if the time is greater than a threshold amount of time (block 1116).

If the time is less than the threshold, the device access enabler 102 and/or the capacitor presence determiner 206 identify a status of the device 100 and/or the strap 502, 504, 702, 704, 802, 804 of the device 100 as being open (block 1118). If the time is greater than the threshold amount of time, the device access enabler 102 and/or the security accessor 208 determines whether the previous status of the device 100 is unlocked and closed (block 1120).

If the security accessor 208 determines that the previous status of the device 100 is unlocked and closed, the security accessor 208 associates the status of the device 100 with being unlocked and closed (block 1122). However, if the security accessor 208 determines that the previous status of the device 100 is not unlocked and/or not closed, the security accessor 208 associates the status of the device 100 with being closed (block 1124). At block 1126, the process returns to FIG. 10.

Figure 12:
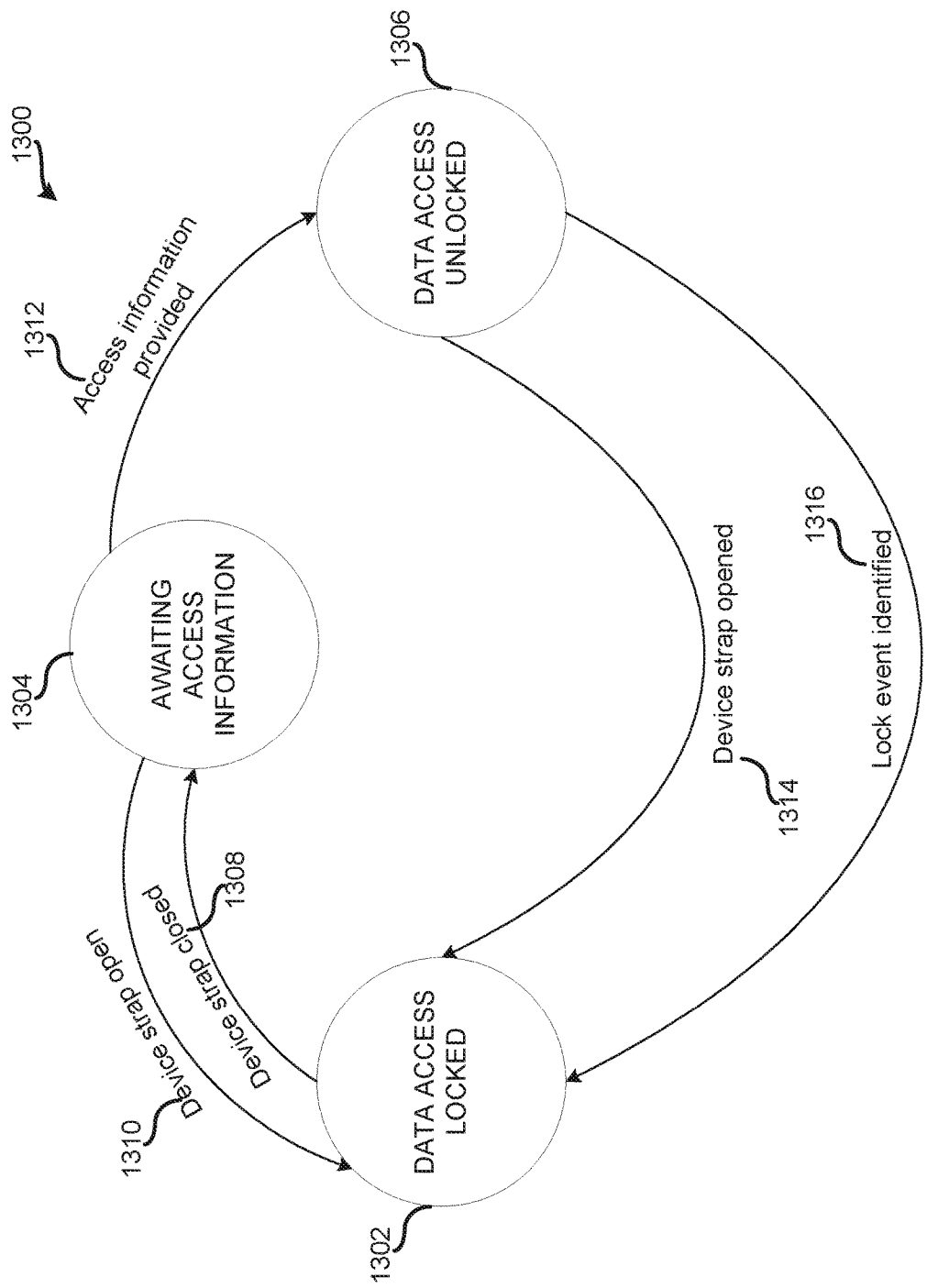
FIG. 12 is an example state diagram representing example transitions between different states of the device FIGS. 1A and 1B.

FIG. 12 is an example state diagram 1300 representing different states of the device 100. The example state diagram 1300 includes a data access locked state 1302, an awaiting access information state 1304 and a data access unlocked state 1306. While an example manner of implementing the device of FIGS. 1A and 1B is illustrated in FIG. 12, one or more of the elements, processes and/or devices illustrated in FIGS. A and 1B may be combined, divided, re-arranged, omitted, eliminated and/or implemented in any other way.

In the illustrated example, when the device 100 is in the data access locked state 1302 and the device access enabler 102, the capacitor presence determiner 206 and/or the security accesser 208 determines that the device 100 and/or the strap 502, 504, 702, 704, 802, 804 of the device 100 is closed 1308, the example device access enabler 102 transitions the state of the device 100 from the data access locked state 1302 to the awaiting access information state 1304. In some examples, access to data on the device 100 is prevented in the awaiting access information state 1304. In some examples, access to data on the device 100 is prevented in the data access locked state 1302.

In the illustrated example, when the device 100 is in the awaiting access information state 1304 and the device access enabler 102, the capacitor presence determiner 206 and/or the security accesser 208 determines that the device 100 and/or the strap 502, 504, 702, 704, 802, 804 of the device 100 is open 1310, the example device access enabler 102 transitions the state of the device 100 from the awaiting access information state 1304 to the data access locked state 1302.

In the illustrated example, when the device 100 is in the awaiting access information state 1304 and the device access enabler 102, the capacitor presence determiner 206 and/or the security accesser 208 determines that access information was provided 1312 (e.g., accurate authenticating information), the example device access enabler 102 transitions the state of the device 100 from the awaiting access information state 1304 to the data access unlocked state 1306. In some examples, access to data on the device 100 is enabled in the data access unlocked state 1306.

In the illustrated example, when the device 100 is in the data access unlocked state 1306 and the capacitor presence determiner 206 and/or the security accesser 208 determines that the device 100 and/or the strap 502, 504, 702, 704, 802, 804 of the device 100 is open 1314, the example device access enabler 102 transitions the state of the device 100 from the data access unlocked state 1306 to the data access locked state 1302. In the illustrated example, when the device 100 is in the data access unlocked state 1306 and the capacitor presence determiner 206 and/or the security accesser 208 identifies a lock event on the device 100 1316, the example device access enabler 102 transitions the state of the device 100 from the data access unlocked state 1306 to the data access locked state 1302. In some examples, the lock event includes a user locking use of the device 100 via an input and/or the device access enabler 102 determining that the device 100 has not be used for a threshold amount of time.

Figure 13:
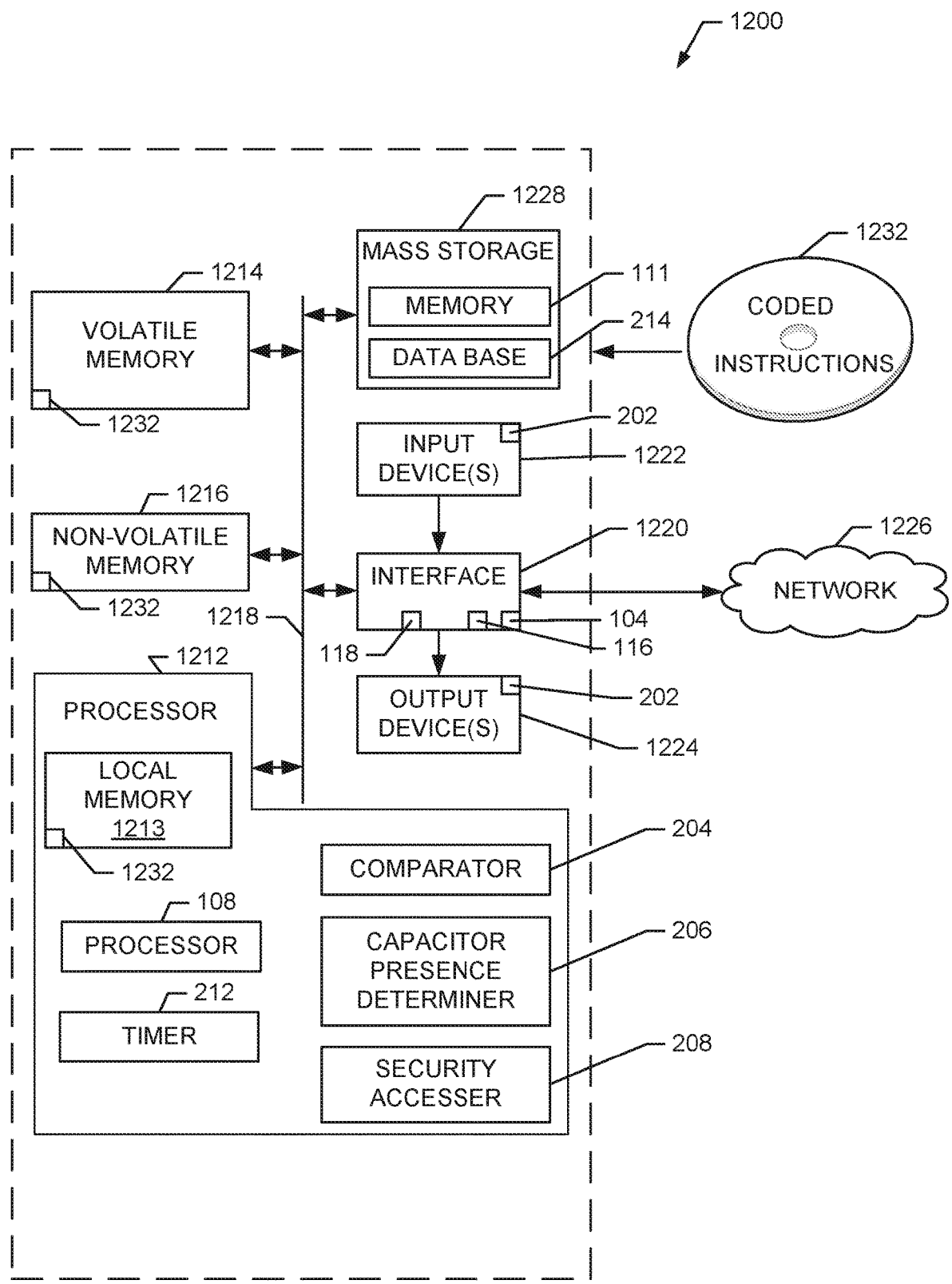
FIG. 13 is a processor platform to execute the instructions of FIGS. 10 and 11 to implement the device access enabler of FIGS. 1A and 1B and, more generally, to implement the examples disclosed herein.

FIG. 13 is a block diagram of an example processor platform 1000 capable of executing the instructions of FIGS. 10 and 11 to implement the wearable device 100 and/or the device access enabler 102 of FIGS. 1A and 1B. The processor platform 1200 can be, for example, a server, a personal computer, a mobile device (e.g., a cell phone, a smart phone, a tablet such as an iPad™), a personal digital assistant (PDA), an Internet appliance, or any other type of computing device.

The processor platform 1200 of the illustrated example includes a processor 1212. The processor 1212 of the illustrated example is hardware.

For example, the processor 1212 can be implemented by one or more integrated circuits, logic circuits, microprocessors or controllers from any desired family or manufacturer. In the illustrated example, the processor 1212 implements the processor 108, the comparator 204, the capacitor presence determiner 206, the security accesser 208 and the timer 212.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface. In the illustrated example, the interface circuit 1220 implements the display 104, the first conductor 116 and the second conductors 118.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system. In the illustrated example, the input device 1222 implements the input/output device 202.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device and/or speakers). The interface circuit 1220 of the illustrated example, thus, typically includes a graphics driver card, a graphics driver chip or a graphics driver processor. In the illustrated example, the output device 1224 implements the input/output device 202.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives. In the illustrated example, the mass storage device 1228 implements the memory 111 and the data base 214.

The coded instructions 1232 of FIGS. 10 and 11 may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods, apparatus and articles of manufacture relate to providing security features to wearable devices that enable a user to use the wearable device without entering security information if the device is being worn and/or other criteria are met, for example. In some examples, the device is determined as being worn based on a response to a reference signal applied to an end of the strap. In some examples, the response indicates that the strap is closed when the response is associated with a resistive/capacitive response. In some examples, the response indicates that the strap is open when the response is associated with a non-resistive/capacitive response.

Example 1 includes an apparatus, comprising: a strap including a first conductor and a second conductor, when the strap is open, the first and second conductors are a first distance apart, when the strap is closed, the first and second conductors are a second distance apart, the first distance is greater than the second distance; and a device access enabler, to: provide a reference signal to the first conductor; and monitor a response to the reference signal to determine if the strap is open or closed.

Example 2 includes the apparatus of example 1, wherein the reference signal is a square wave.

Example 3 includes the apparatus of examples 1 or 2, wherein the device access enabler is to determine that the strap is closed based on the response being associated with a resistive/capacitive response.

Example 4 includes the apparatus of example 3, wherein the resistive/capacitive response is associated with the response satisfying a reference value after a threshold amount of time has lapsed.

Example 5 includes the apparatus of examples 1, 2, 3, or 4, wherein the device access enabler is to determine that the strap is open based on the response being associated with a non-resistive/capacitive response.

Example 6 includes the apparatus of example 5, wherein the non-resistive/capacitive response is associated with the response satisfying a reference value before a threshold amount of time has lapsed.

Example 7 includes the apparatus of examples 1, 2, 3, 4, 5, or 6, wherein the apparatus is a wearable device.

Example 8 includes the apparatus of examples 1, 2, 3, 4, 5, 6, or 7, wherein, in response to the device access enabler determining that the strap is open, the device access enabler to request access information prior to enabling access to the wearable device.

Example 9 includes the apparatus of examples 1, 2, 3, 4, 5, 6, 7, or 8, wherein, in response to the device access enabler determining that the strap is closed, the device access enabler to enable access to the wearable device if access information has been provided during a wearing period of the wearable device.

Example 10 includes the apparatus of examples 1, 2, 3, 4, 5, 6, 7, 8, or 9, wherein the device access enabler is to monitor the response to the reference signal using a comparator and a timer, the comparator is to compare the response to a reference value to determine when the response satisfies the reference value and the timer is to determine an amount of time taken for the response to satisfy the reference value, the device access enabler to identify the strap as being closed based on the amount of time being equal to or greater than a threshold amount of time, the device access enabler to identify the strap as being open based on the amount of time being less than the threshold amount of time.

Example 11 includes an apparatus, comprising: an input/output device to provide a reference signal to an end of a wearable device, the input/output device to receive a response based on the reference signal provided; a comparator to determine when the response satisfies a reference value; and a determiner to determine a status of the wearable device based on when the response satisfies the reference value.

Example 12 includes the apparatus of example 11, wherein the status of wearable device is associated with a strap of the wearable device being open, closed, closed and locked, or closed and unlocked.

Example 13 includes the apparatus of example 12, wherein the determiner includes a capacitor presence determiner, when the status of the wearable device is associated with the strap of the wearable device being closed, the capacitor presence determiner to identify a presence of a capacitor at the end of the wearable device based on the response, when the status of the wearable device is associated with the strap of the wearable device being open, the capacitor presence determiner to identify an absence of the capacitor at the end of the wearable device based on the response.

Example 14 includes the apparatus of examples 12 or 13, wherein when the determiner determines that the status of the wearable device is associated with the strap of the wearable device being open, a security accessor to request access information prior to enabling access to the wearable device.

Example 15 includes the apparatus of examples 12, 13, or 14, wherein when the determiner determines that the status of wearable device is associated with the strap of the wearable device being closed, a security accessor to enable access to the wearable device if access information has been provided within a wearing period of the wearable device.

Example 16 includes the apparatus of example 15, wherein the wearing period includes when the wearable device is turned on and is being worn.

Example 17 includes a method, comprising: providing a reference signal to an end of a wearable device; receiving a response based on the reference signal provided; determining when the response satisfies a reference value; and determining, by executing an instruction with at least one processor, a status of the wearable device based on when the response satisfies the reference value, wherein the status of wearable device is associated with a strap of the wearable device being open or closed.

Example 18 includes the method of example 17, wherein when the status of the wearable device is associated with the strap of the wearable device being closed, identifying a presence of a capacitor at the end of the wearable device based on the response.

Example 19 includes the method of examples 17 or 18, wherein when the status of the wearable device is associated with the strap of the wearable device being open, the capacitor presence determiner to identify an absence of the capacitor at the end of the wearable device based on the response.

Example 20 includes the method of examples 17, 18, or 19, wherein when the status of wearable device is associated with the strap of the wearable device being open, requesting access information prior to enabling access to the wearable device.

Example 21 includes the method of examples 17, 18, 19, or 20, wherein when the status of wearable device is associated with the strap of the wearable device being closed, enabling access to the wearable device if access information has been provided within a wearing period of the wearable device.

Example 22 includes a tangible computer-readable medium comprising instructions that, when executed, cause a processor to, at least: provide a reference signal to an end of a wearable device; receive a response based on the reference signal provided; determine when the response satisfies a reference value; and determine a status of the wearable device based on when the response satisfies the reference value, wherein the status of wearable device is associated with a strap of the wearable device being open or closed.

Example 23 includes the computer-readable medium as defined in example 22, wherein the instructions, when executed, further cause the processor to request access information prior to enabling access to the wearable device when the status of wearable device is associated with the strap of the wearable device being open.

Example 24 includes the computer-readable medium as defined in examples 22 or 23, wherein the instructions, when executed, further cause the processor to enable access to the wearable device if access information has been provided within a wearing period of the wearable device when the status of wearable device is associated with the strap of the wearable device being closed.

Example 25 includes a system for a wearable device, comprising: means for providing a reference signal to an end of the wearable device; means for receiving a response based on the reference signal provided; means for determining when the response satisfies a reference value; and means for determining a status of the wearable device based on when the response satisfies the reference value, wherein the status of wearable device is associated with a strap of the wearable device being open or closed.

Example 26 includes the system as defined in example 25, further including means for requesting access information prior to enabling access to the wearable device when the status of wearable device is associated with the strap of the wearable device being open.

Example 27 includes the system of examples 25 or 26, further including means for enabling access to the wearable device if access information has been provided within a wearing period of the wearable device when the status of wearable device is associated with the strap of the wearable device being closed.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a strap including a first conductor and a second conductor, when the strap is closed the first conductor and the second conductor act as a capacitor; and
   processor circuitry to:
      determine that the strap is closed when a response to a signal is indicative of the first conductor and the second conductor acting as the capacitor, the processor circuitry to determine the response is indicative of the first conductor and the second conductor acting as the capacitor when the response satisfies a reference value after a threshold amount of time has elapsed;
      determine that the strap is open when the response to the signal indicates the first conductor and the second conductor are not acting as the capacitor; and
      in response to determining that the strap is open, request a passcode.

2. The apparatus of claim 1, wherein the signal is a square wave, and the processor circuitry is to determine that the strap is open based on the response substantially tracking the square wave.

3. The apparatus of claim 1, wherein when the strap is open, the response satisfies the reference value before the threshold amount of time has elapsed.

4. The apparatus of claim 1, wherein the processor circuitry is to request the passcode prior to enabling access to a function of the apparatus.

5. An apparatus comprising:
   a strap including:
      a first conductor;
      a second conductor to overlap the first conductor when the strap is closed; and
      logic circuitry to:
         determine that the first and second conductors overlap based on a response to a signal to the first conductor corresponding to a capacitance indicative of the overlap between the first conductor and the second conductor, the logic circuitry to identify that the response corresponds to the capacitance indicative of the overlap when the response satisfies a reference value after a threshold amount of time has elapsed;
         in response to determining that the first conductor and the second conductor overlap, identify a status of the strap as closed; and
         if access information has not been provided within a wearing period associated with wearing of the strap, request access information prior to enabling use of an electronic device carried by the strap.

6. The apparatus of claim 5, wherein the signal is a square wave.

7. The apparatus of claim 6, wherein the logic circuitry is to determine that the strap is open based on the response substantially tracking the square wave.

8. The apparatus of claim 5, wherein the response will satisfy the reference value before the threshold amount of time has elapsed when the strap is open.

9. The apparatus of claim 5, wherein the logic circuitry is to:
   determine that the strap is open based on the response to the signal not corresponding to the capacitance indicative of the overlap between the first conductor and the second conductor; and
   in response to determining that the strap is open, request access information prior to enabling access to the apparatus.

10. A method comprising:
    determining that a strap including a first conductor and a second conductor is closed by comparing a response to a signal to the first conductor to a threshold indicative of the first conductor and the second conductor acting as a capacitor, the threshold including a reference value corresponding to a voltage after a threshold amount of time has elapsed since the signal was transmitted to the first conductor;
    determining that the strap is open when the response to the signal is not indicative of the first and the second conductors acting as a capacitor; and
    in response to determining that the strap is open, initiating, with logic circuitry, a request for access information.

11. The method of claim 10, wherein the signal is a square wave, and the determining that the strap is open is based on the response substantially tracking the square wave.

12. The method of claim 10, wherein the initiating of the request for the access information occurs prior to enabling access to an apparatus.

13. The method of claim 12, wherein the access information includes a passcode.

14. The apparatus of claim 5, wherein the wearing period occurs when the electronic device is turned on and the strap is being worn.

15. The apparatus of claim 5, wherein the access information includes a passcode.

* * * * *